(12) United States Patent
Olgaard et al.

(10) Patent No.: US 7,773,531 B2
(45) Date of Patent: Aug. 10, 2010

(54) METHOD FOR TESTING DATA PACKET TRANSCEIVER USING LOOP BACK PACKET GENERATION

(75) Inventors: Christian Volf Olgaard, Sunnyvale, CA (US); Ray Wang, San Ramon, CA (US); Peter Petersen, Brentwood, CA (US)

(73) Assignee: LitePoint Corporation, Sunnyvale, CA (US)

( * ) Notice: Subject to any disclaimer, the term of this patent is extended or adjusted under 35 U.S.C. 154(b) by 103 days.

(21) Appl. No.: 12/170,665

(22) Filed: Jul. 10, 2008

(65) Prior Publication Data

US 2010/0008237 A1    Jan. 14, 2010

(51) Int. Cl.
*H04L 12/26* (2006.01)
*H04B 17/00* (2006.01)
*G01R 31/28* (2006.01)

(52) U.S. Cl. .................. 370/241; 370/249; 370/252; 714/724; 714/742; 714/750; 455/67.13; 455/67.14

(58) Field of Classification Search ............... 370/241, 370/249, 252; 455/67.11, 67.12, 67.13, 67.14; 714/736, 738, 750, 751, 724, 742
See application file for complete search history.

(56) References Cited

U.S. PATENT DOCUMENTS

| | | | | |
|---|---|---|---|---|
| 6,775,804 B1 * | 8/2004 | Dawson | ...................... | 714/776 |
| 7,093,172 B2 | 8/2006 | Fan et al. | | |
| 7,127,648 B2 * | 10/2006 | Jiang et al. | ................... | 714/715 |
| 7,233,875 B2 * | 6/2007 | Huang | ......................... | 702/117 |
| 7,243,278 B2 * | 7/2007 | Arkin | ......................... | 714/724 |
| 2004/0030977 A1 * | 2/2004 | Jiang et al. | ................... | 714/742 |
| 2004/0187049 A1 * | 9/2004 | West | ......................... | 714/699 |
| 2004/0220762 A1 * | 11/2004 | Oeflein et al. | ............... | 702/107 |
| 2006/0012388 A1 * | 1/2006 | Lin et al. | .................... | 324/750 |
| 2006/0038579 A1 * | 2/2006 | Guthrie et al. | .............. | 324/765 |
| 2006/0183432 A1 * | 8/2006 | Breslin et al. | ................. | 455/69 |
| 2006/0245484 A1 * | 11/2006 | Calvin et al. | ................ | 375/227 |
| 2007/0296476 A1 * | 12/2007 | Hessen-Schmidt | .......... | 327/162 |
| 2009/0092053 A1 * | 4/2009 | Olgaard | ...................... | 370/241 |

FOREIGN PATENT DOCUMENTS

EP    1890507 A1    2/2008

OTHER PUBLICATIONS

International Search Report corresponding to International Patent Application No. PCT/US2009/047644, Korean Intellectual Property Office, dated Dec. 29, 2009, 3 pgs.
Written Opinion corresponding to International Patent Application No. PCT/US2009/047644, Korean Intellectual Property Office, Dated Dec. 29, 2009, 3 pgs.

* cited by examiner

*Primary Examiner*—Chi H Pham
*Assistant Examiner*—Ahmed Elallam
(74) *Attorney, Agent, or Firm*—Vedder Price, P.C.

(57) ABSTRACT

A method for testing a data packet transceiver as a device under test (DUT) by communicating, between one or more test instruments and the DUT, multiple data packets having at least one mutually distinct signal characteristic, such as data packet type, transmission power or transmission frequency.

18 Claims, 5 Drawing Sheets

|  | TXPOWER1 | TXPOWER2 | TXPOWER3 | TXPOWER4 | TXPOWER5 | TXPOWER6 | TXPOWER7 | TXPOWER8 | TXPOWER9 | TXPOWER10 |  |
|---|---|---|---|---|---|---|---|---|---|---|---|
| PACKET TYPE 1 | 10 | 10 | 20 | 0 | 10 | 50 | 0 | 0 | 0 | 0 | 100 RX PACKETS |
| PACKET TYPE 2 | 10 | 10 | 0 | 20 | 10 | 0 | 50 | 0 | 0 | 0 | 100 RX PACKETS |
| PACKET TYPE 3 | 10 | 10 | 10 | 10 | 10 | 0 | 0 | 50 | 0 | 0 | 100 RX PACKETS |
| PACKET TYPE 4 | 10 | 10 | 10 | 10 | 10 | 0 | 0 | 0 | 50 | 0 | 100 RX PACKETS |
| PACKET TYPE 5 | 10 | 10 | 10 | 10 | 10 | 0 | 0 | 0 | 0 | 50 | 100 RX PACKETS |
|  | 50 | 50 | 50 | 50 | 50 | 50 | 50 | 50 | 50 | 50 |  |

METHOD FOR TESTING DATA PACKET TRANSCEIVER USING LOOP BACK PACKET GENERATION

BACKGROUND

1. Field of Invention

The present invention relates to test methods for electronic signal transceivers, in a particular, to test methods for testing digital signal transceivers that communicate via data packets.

2. Related Art

When performing manufacturing tests of digital signal transceivers, it is often necessary to create dedicated manufacturing test software drivers. Such drivers maybe independent and dedicated to testing the Device Under Test (DUT), or maybe supplemental functions that are added to the normal software driver included and used in the final product. Such drivers typically provide special functions necessary to achieve special test modes to ensure comprehensive testing of the final product. Such test modes are sometimes developed early in the design process to assist the chip designers in accessing and testing the device during the early development phase. However, if these drivers are also used during manufacturing test, they often result in a less optimal implementation for mass production.

One method that has proven to provide significant improvements in manufacturing test times is the use of testing with multiple data packets. Such methods are described in the following U.S. patent applications, the disclosure of each hereby incorporated herein by reference: U.S. patent application Ser. No. 11/161,692, filed Aug. 12, 2005 (now U.S. Pat. No. 7,564,896 issued Jul. 21, 2009), and entitled "Method For Measuring Multiple Parameters Of A Signal Transmitted By A Signal Generator"; co-pending U.S. patent application Ser. No. 11/766,282, filed Jun. 21, 2007, and entitled "System And Method For Testing Wireless Devices"; and co-pending U.S. patent application Ser. No. 11/839,814, filed Aug. 16, 2007, and entitled "System For Testing An Embedded Wireless Transceiver". However, providing the capability to perform testing with multiple data packets often requires incorporation of functions within the manufacturing software driver which are not otherwise part of the production chip development, i.e., these additional functions are not necessary to normal chip operation, but must be added to the software driver to support the manufacturing testing with multiple data packets.

In some instances, adding the necessary functions for performing such manufacturing tests can be problematic, since the software must sometimes be written in a manner that makes it difficult to get the DUT to perform the desired functions without significant additional software overhead, and sometimes even hardware overhead in the form of additional programmable interconnects within the integrated circuitry, both of which can reduce the effectiveness of testing with multiple data packets, as well as adversely affect normal operation later.

Further, in some cases it may not be possible to identify all requirements on the part of the DUT during testing when developing the test software. Accordingly, multiple iterations of the software or, alternatively, unnecessary "over design" of the functionality of the software results.

Accordingly, it would be desirable to achieve the benefits provided by testing with multiple data packets, while avoiding these limitations and disadvantages.

SUMMARY

In accordance with the presently claimed invention, a method is provided for testing a data packet transceiver as a device under test (DUT) by communicating, between one or more test instruments and the DUT, multiple data packets having at least one mutually distinct signal characteristic, such as data packet type, transmission power or transmission frequency.

In accordance with one embodiment of the presently claimed invention, a method for testing a data packet transceiver as a device under test (DUT) by communicating pluralities of data packets between one or more test instruments and the DUT includes:

programming the DUT for loop back operation, wherein a received data packet is decoded to produce decoded data and the decoded data is encoded to produce a corresponding new data packet for transmission;

transmitting, with the one or more test instruments, a plurality of sequential test data packets for reception by the DUT, wherein at least first and second portions of the transmitted plurality of sequential test data packets have at least one of a plurality of mutually distinct signal characteristics including data packet type, transmission power and transmission frequency;

receiving, with the one or more test instruments, a plurality of sequential DUT data packets from the DUT; and processing the plurality of sequential DUT data packets.

In accordance with another embodiment of the presently claimed invention, a method for testing a data packet transceiver as a device under test (DUT) by communicating pluralities of data packets between one or more test instruments and the DUT includes:

programming the DUT for loop back operation, wherein a received data packet is decoded to produce decoded data and the decoded data is encoded to produce a corresponding new data packet for transmission;

communicating respective pluralities of data packets between the one or more test instruments and the DUT by encoding a plurality of test data with the one or more test instruments to produce a test data packet, transmitting the test data packet with the one or more test instruments, receiving the test data packet with the DUT, decoding the received test data packet with the DUT to produce a plurality of DUT data, encoding the plurality of DUT data with the DUT to produce a DUT data packet, transmitting the DUT data packet with the DUT, receiving the DUT data packet with the one or more test instruments, and repeating the encoding of a plurality of test data, the transmitting of the test data packet, the receiving of the test data packet, the decoding of the received test data packet, the encoding of the plurality of DUT data, the transmitting of the DUT data packet and the receiving of the DUT data packet to produce a plurality of test data packets, a plurality of transmitted test data packets and a plurality of received DUT data packets, wherein selected respective ones of the plurality of transmitted test data packets have at least one of a plurality of mutually distinct signal characteristics including data packet type, transmission power and transmission frequency; and processing the plurality of received DUT data packets.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Figure 1:
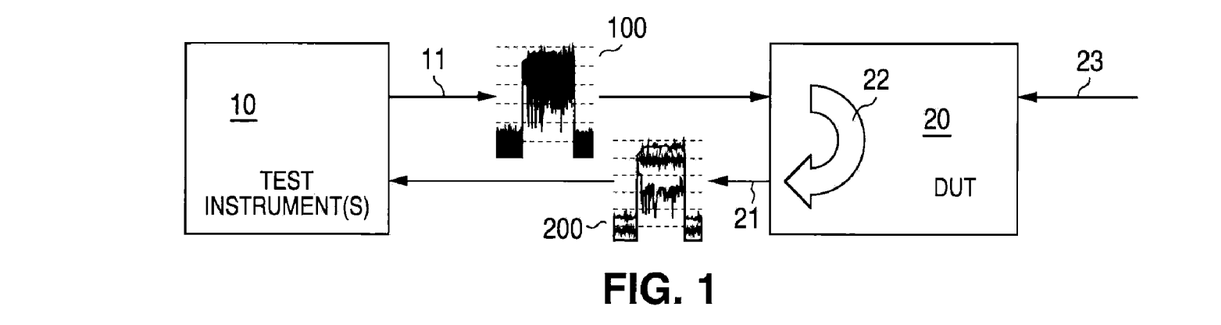
FIG. 1 is a functional block diagram depicting production testing of a device under test (DUT) with one or more test instruments in accordance with the presently claimed invention.

Referring to FIG. 1, in accordance with the presently claimed invention, one or more test instruments 10 are used to test the DUT 20 in which a loop back 22 operation is employed. As discussed in more detail below, this allows much, if not all, of the control of the testing to be moved from the DUT 20 to the test instrument(s) 10. The test instrument(s) 10 transmit the types of data packets desired for analysis, in response to which the DUT 20 returns replicas of such data packets back to the test instrument(s) 10, with some delay, for analysis. (As discussed herein, the test instrument(s) 10 will need to provide signal transmission, signal reception and signal analysis functions. It will be readily appreciated that, depending upon how these functions are implemented, such instrumentation can be implemented by one test instrument or by coupling multiple test instruments together.)

The transmitted signal 11 includes data packets 100 produced by the test instrument(s) 10. The DUT 20, as part of its loop back operation 22, receives these data packets 100, decodes the data and then re-encodes the data to produce a return transmit signal 21 containing corresponding data packets 200 for analysis by the instrument(s) 10. Such returned data packets 200 can be analyzed for various transmit parameters, such as power, quality (e.g., error vector magnitude (EVM)), spectral properties (e.g., associated spectral, or transmission, mask), etc. Further, since the DUT 20 is receiving the test data packets 100 and looping them back, the instrument(s) 10 know what return data to expect and, once decoded, such returned data packets can be compared with the original test data packets, thereby allowing the bit error rate (BER) for the DUT 20 to be determined. If one or more of the test data packets 100 is not received by the DUT 20, no corresponding data packets will be received as part of the returned data packets 200, thereby allowing the packet error rate (PER) for the DUT 20 to be determined. It will be readily appreciated by one of ordinary skill in the art that such testing can be performed in parallel, i.e., test data packets 100 can be transmitted while returning data packets 200 are being received substantially simultaneously, thereby allowing both transmit and receive functions of the DUT 20 to be tested in parallel.

Accordingly, virtually all that is necessary to enable this type of testing is one or more appropriate control signals or programming 23 provided to the DUT 20, in response to which the DUT 20 is set for the correct operating frequency or frequencies for receiving the incoming signal 11 and transmitting the outgoing signal 21, and the loop back mode 22 is enabled.

Preferably, as part of this loop back mode of testing, the test data packets 100 transmitted by the test instrument(s) 10 includes a sequence of data packets having different signal characteristics, including different data packet types, different data packet transmission levels, or powers, and different data packet transmission frequencies.

Figure 2:
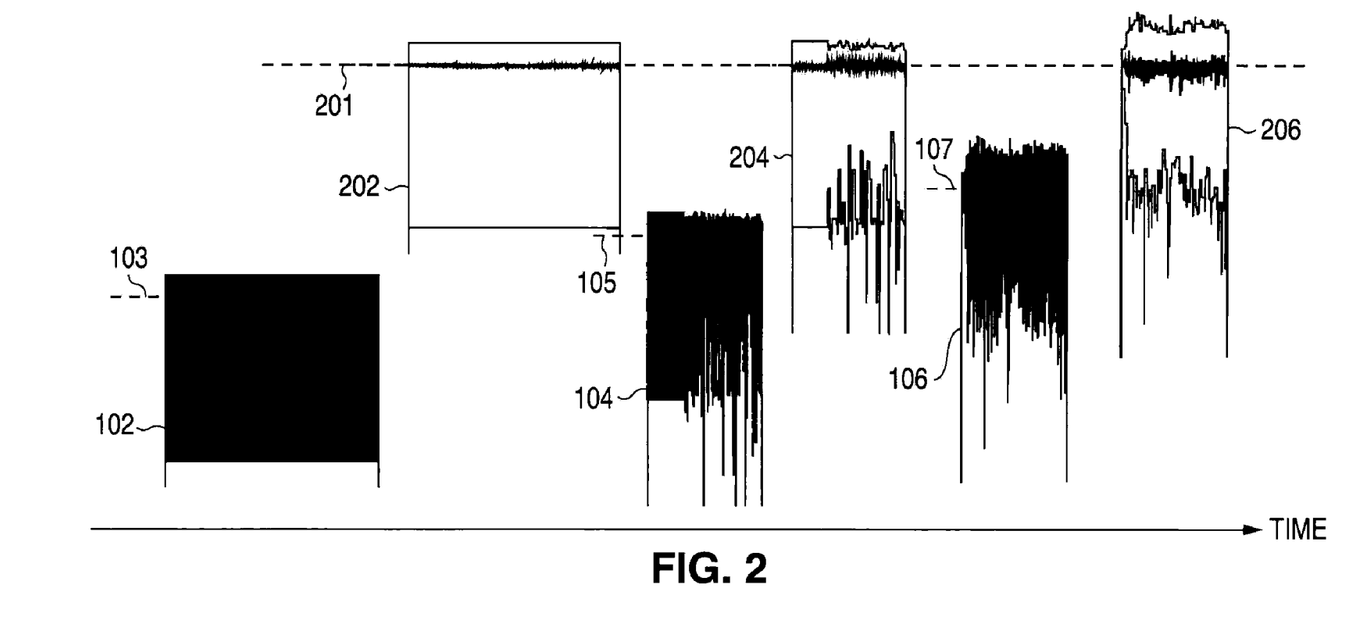
FIG. 2 depicts a signal sequence for a test method in accordance with an exemplary embodiment of the presently claimed invention.

Referring to FIG. 2, in accordance with an exemplary embodiment of the presently claimed invention, the test data packets 100 include a sequence of data packets 102, 104, 106, in response to which the DUT 20 returns a sequence of data packets signals 202, 204, 206. The first test data packet 102, with an average transmission power 103, is received by the DUT 20 (FIG. 1), which decodes and then re-encodes the received data to transmit a return data packet 202, with an average transmission power 201. (It will be readily appreciated that this average transmission power 201 is higher and will generally be constant throughout the return data packets 200 since it is transmitted at the physical transmit level of the DUT 20 and attenuated only by losses between the DUT 20 and test instrument(s) 10.) Using this returned data packet 202, the test instrument(s) 10 can analyze the properties of the received signal 202, such as its power level 201, spectral properties, transmission quality (e.g., EVM), etc. Additionally, the test instrument(s) 10 can demodulate and decode the received data packet 202 and compare it to the corresponding test data originally transmitted to the DUT 20, from which the BER can be derived. Similarly, the PER can be determined by confirming whether a received data packet from the DUT 20 corresponds to an originally transmitted test data packet, or, alternatively, simply confirming whether a valid data packet has been received. By including cyclic redundancy check (CRC) data within the packets it transmits, the test instrument(s) 10 can easily confirm receipt of valid data packets by the DUT 20. If the DUT 20 receives a packet with a CRC error, that packet will be discarded or disregarded and no return packet will be sent back to the test instrument(s) 10. Hence, the test instrument(s) 10 can compute PER by simply counting the number of returned data packets.

Following reception of the first return data packet 202, another test data packet 104 is transmitted. This next data packet 104 is of a different type and at a different transmission power 105. For this data packet 104, the transmission power 105 is higher to achieve a higher signal-to-noise ratio (SNR), thereby providing a higher input power level for the DUT 20, which can be useful when testing BER and PER of the DUT 20 in parallel with the testing of the quality of the DUT transmission signal 21. In response, the DUT 20 returns a corresponding data packet 204. The next test data packet 106 is then transmitted, again with a different transmission power 107 and with a different data packet or modulation type. In return, the DUT 20 replies with a corresponding data packet 206 at the expected transmission power 201.

Generally, since the DUT 20 is transmitting at a higher power level 201 than the power levels 103, 105, 107 of the test instrument(s) 10, the test instrument(s) should not experience reception difficulties associated with a low SNR, and the individual bits of the return data packets 202, 204, 206 can generally be demodulated if the transmission quality is satisfactory. As the transmission quality, i.e., on the part of the DUT 20, is monitored, the quality of the test will be ensured. Maintaining the minimum transmission quality with a high SNR will ensure correct demodulation of the return data packets 202, 204, 206, thereby ensuring that any bit errors can be assumed to be incurred only within the DUT 20 and not within the test instrument(s) 10.

The discussion so far has assumed that the DUT 20 will receive all of the transmitted data packets 100. However, if one or more data packets are not received by the DUT 20 (as recognized by the failure of the test instrument(s) 10 to receive corresponding return data packets), the test instrument(s) 10 can simply transmit one or more additional data packets of the same type(s) as necessary. If desired, the transmission power(s) of the test data packets 100 can also be increased if test data packets 100 continue to be missed by the DUT 20. At some point, however, if the test data packets 100 continue to be missed by the DUT 20, this is probably an indication of a bad DUT 20 and transmission of the test data packets 100 can be terminated.

It will be readily understood by one of ordinary skill in the art that the transmit and receive functions, as discussed herein, can be mutually exclusive such as is often true in time division duplex (TDD) systems. Of course, if the DUT 20 is capable of simultaneous transmission and reception, such parallel, or simultaneous, transmission and reception capabilities can be used during the testing, during which there will be an offset in time (i.e., as between the test data packets 100 and return data packets 200), and the transmitter and receiver within the DUT 20 will operate at different frequencies.

Figure 3:
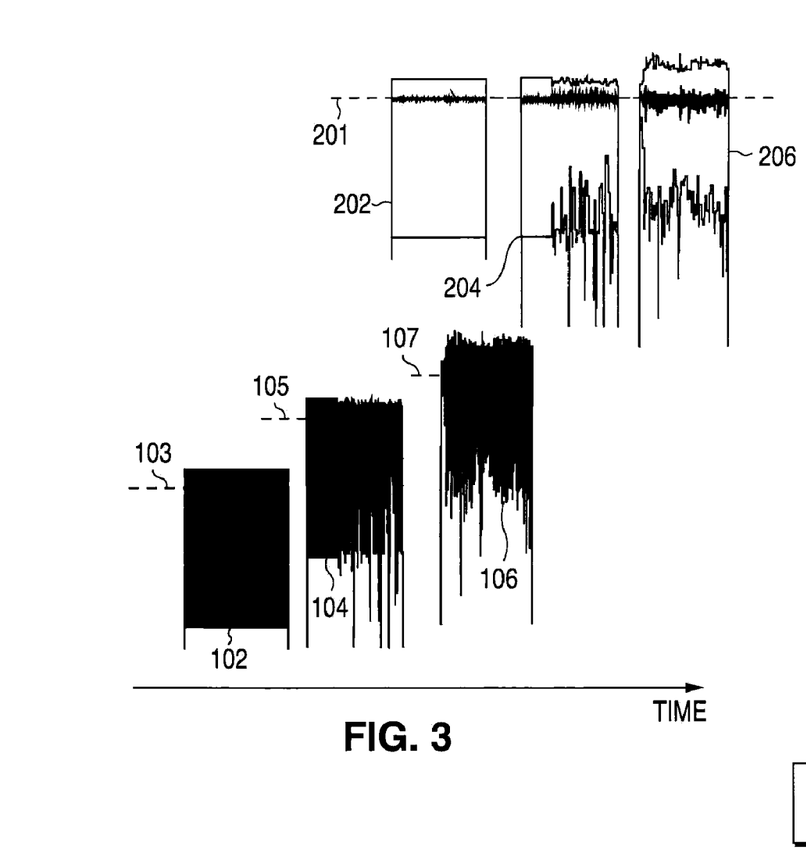
FIG. 3 depicts a signal sequence for a test method in accordance with an exemplary embodiment of the presently claimed invention.

Referring to FIG. 3, reception and transmission at different frequencies by the DUT 20 allow it to begin transmitting its return data packets 202, 204, 206 soon after it begins receiving the test data packets 102, 104, 106. After receiving the first test data packet 102, the DUT 20 can begin transmitting its first return data packet 202, e.g., while still receiving the second test data packet 104. (In this example, the transmitter and receiver are not fully synchronized; however, it will be readily apparent to one of ordinary skill in the art that the transmitter and receiver can be synchronized so that transmitted and received data packets are aligned in defined time slots. (As seen in the Figure, there is a time delay between the received test data packet and its corresponding return data packet, which will be at least as long as it takes for completion of the loop back operation 22 within the DUT 20.)

Figure 4:
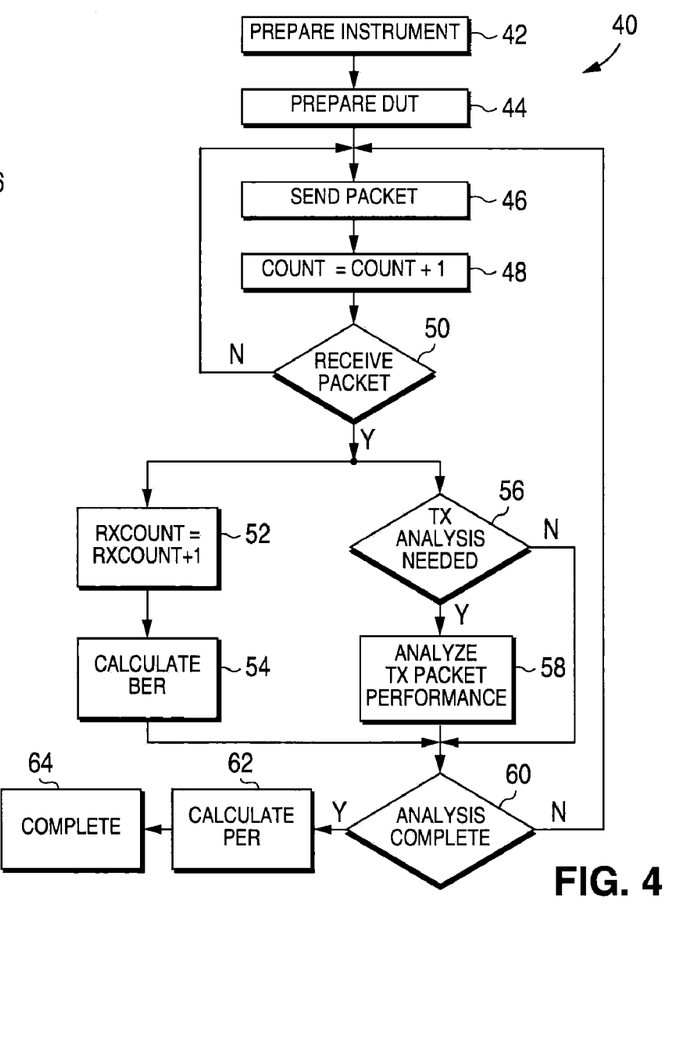
FIG. 4 is a flow chart for a test method in accordance with an exemplary embodiment of the presently claimed invention.

Referring to FIG. 4, a test method in accordance with an exemplary embodiment 40 of the presently claimed invention begins with preparation 42 of the test instrument(s) 10 and preparation 44 of the DUT 20, e.g., by programming the DUT 20 to operate in a loop back mode. (Although shown here in sequence, these preparations 42, 44 can be initiated in any order or in parallel.) Preparation 42 of the test instrument(s) 10 includes preparation of the desired test sequence, types of data packets, transmission powers and transmission frequencies, as well as the types of data comparisons and analyses. Preparation 44 of the DUT 20 includes programming the DUT 20 for loop back operation at the desired frequencies, and can also include programming the DUT 20 to initiate testing by sending an initial data packet to the test instrument(s) to establish the system timing and indicate its readiness. In the following discussion, it is assumed that the test instrument(s) 10 will initiate the test sequence.

When the instrument(s) 10 and the DUT 20 are ready, the instrument(s) 10 begin 46 by transmitting a data packet to the DUT 20. When the data packet has been transmitted, the internal packet counter is incremented 48. Instrument(s) 10 then await reception 50 of a return data packet from the DUT 20. If no packet is returned, the instrument(s) 10 send another data packet 46. As will be readily appreciated, in some instances, more than one data packet may need to be transmitted before the DUT 20 begins to reply by with its own data packets.

If a return data packet is received, the received data packet counter is incremented 52, thereby enabling computation of a ratio between transmitted and received data packets. If testing requirements include a BER commutation 54, the received data packet can be demodulated and its contents compared to the contents of the originally transmitted test data packet.

Additionally, when a return data packet is received, it can be initially examined to see if analyses is required 56. If so, the data packet is analyzed 58. Alternatively, the data packet can be stored in memory for later analyses, e.g., following completion of the full test sequence. This will often be desirable in time synchronous systems when the time needed for analysis is longer than the time between data packets.

Next is a determination 60 of any required analyses. If further analysis is required, another data packet is transmitted 46, and these processes are repeated. If, however, no further analysis, or no analyses at all, are required, the PER can be computed 62, e.g., by computing the ratio of the number of expected return data packets not received to the number of transmitted test data packets, following which the test is complete 64.

If, as discussed above, more than one type of test data packet is transmitted during the test, it maybe desirable to separate the BER and PER tests, e.g., by separately tracking the types of data packets transmitted, the types of data packets received and the corresponding bit error counts. Similarly, transmit data obtained from the analyses may need to be separated. For example, if computing the average EVM over multiple captures of the same data packet, the EVM is normally separated relative to the type of data packet being transmitted by the DUT 20. For example, in accordance with the Bluetooth standard, the EVM is analyzed for 2 Mbps and 3 Mbps packets, which have different limits, thereby requiring separate EVM values prior to analyses. This, however, will be simple, since the test instrument(s) 10 control the data packets being transmitted and can account for and separately track returned data packets as necessary. Similarly, in the case of transmitting test to data packets without receiving corresponding return data packets, the test instrument(s) 10 can keep track of the number of data packets necessary for analyses, with the possible need to transmit more test to data packets than otherwise necessary. If, however, a data packet is not received correctly and, therefore, appears to be of a different type than what was transmitted, the test instrument(s) 10 can analyze the received data bits to identify such bad packets.

As should be readily apparent from the discussion above, such testing methodology allows a DUT 20 to be tested in a simple manner with minimal interaction required between the DUT 20 and test instrument(s) 10. For example, once the DUT 20 operating frequency has been set, the test instrument(s) 10 can begin sending data packets 100 to the DUT 20, which will then loop back the data packets as returned data packets 200 to the instrument(s) 10. The test instrument(s) 10 can test the transmit performance and receive performance in parallel. However, without also providing more extensive control of the DUT 20, the transmission power and frequency of the DUT 20 will generally remain fixed at respective predetermined values. Without also providing a way to transfer control or test data from the DUT 20 to the test instrument(s) 10, e.g., by some form of query function, further testing of the received capability of the DUT 20 in the form of a received signal strength indication (RSSI) cannot be easily achieved.

However, in accordance with an exemplary embodiment of the presently claimed invention, the DUT 20 can be programmed to change its transmission power in accordance with the predetermined sequence. For example, the DUT can be programmed to change its transmission power for every N test data packets received. Such changing of the DUT transmission power will not affect its receive function test, so the test instrument(s) 10 can transmit all test data packets during such sequence at the same levels independent of the DUT transmission power.

Figure 5:
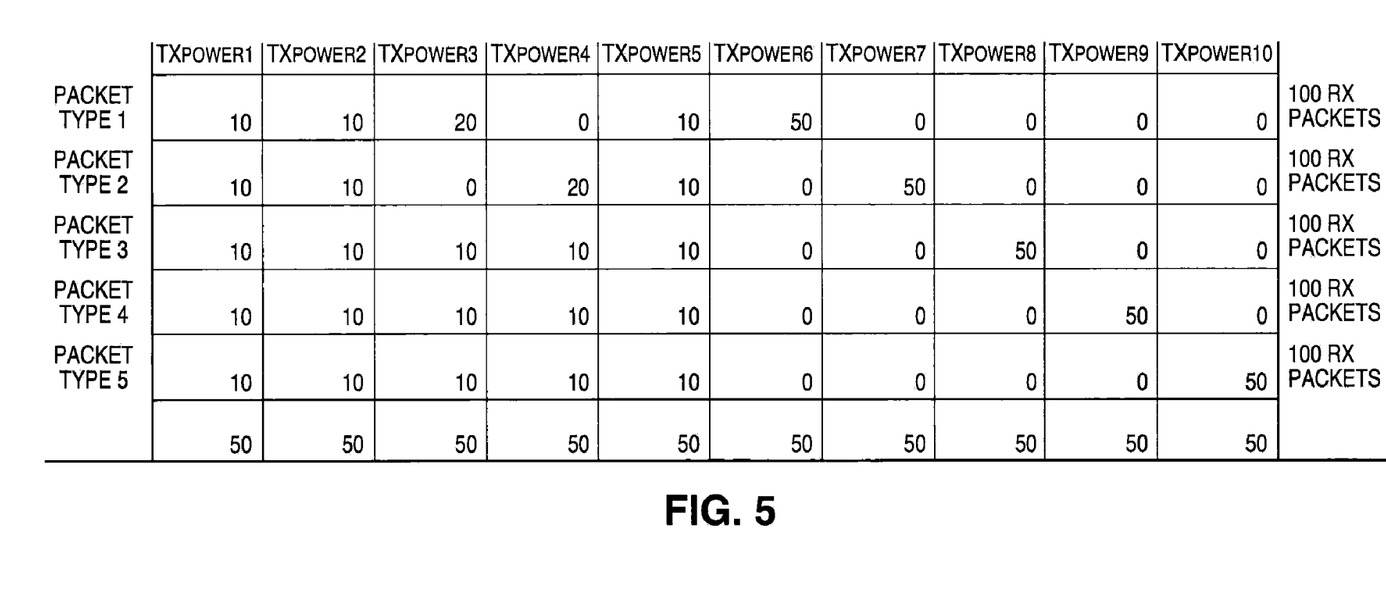
FIG. 5 is a table identifying various data packets being transmitted at various transmission powers in accordance with an exemplary embodiment of the presently claimed invention.

Referring to FIG. 5, in accordance with one example of this technique, the DUT 20 will change its transmission power following its transmission of every 50 (N=50) test data packets being received. This table is read one column at a time. Hence, according to the first column (TXpower1), the test instrument(s) 10 will send packets of type 1 until the DUT 20 has received ten such test data packets (in response to which the DUT 20 transmits ten return data packets). The test instrument(s) 10 then send type 2 data packets until the DUT 20 has received ten such data packets. This process repeats for data packet types 3, 4 and 5, with all such data packets transmitted at the same transmission power. Having now received fifty test data packets (ten type 1+ten type 2+ten type 3+ten type 4+ten type 5), the DUT 20 now changes to the next transmission power level (TXpower2), at which ten packets of each data packet type are again transmitted by the test instrument(s) 10, following which the DUT 20 changes to the next transmit power (TXpower3). At this power level TXpower3, the test instrument(s) 10 change the transmit sequence such that twenty of data packets type 1 are transmitted followed by ten test data packets of types 3, 4 and 5. Having now received another fifty test data packets, the DUT 20 changes its transmission power to the next level TXpower4. At this power level TXpower4, the test instrument(s) 10 transmit twenty test data packets of type 2 followed by ten test data packets of types 3, 4 and 5 for another total of fifty test data packets. DUT 20 then changes its transmission power to the next level TXpower5 where again ten test data packets of each type are transmitted, received and returned. This is then followed by the DUT 20 returning fifty data packets for each of data packet types 1, 2, 3, 4 and 5 at respective power transmission levels TXpower6, TXpower7, TXpower8, TXpower9, TXpower10. (These combinations of packet types and transmission powers are merely exemplary, with virtually an unlimited number of combinations possible in accordance with the presently claimed invention.)

The DUT 20 needs only to count the number of total packets it requires to transmit at each transmission power level. The test instrument(s) 10 control what types of data packets are transmitted for return by the DUT 20 by transmitting the appropriate data packet types to the DUT 20. Accordingly, implementation within the DUT 20 is simple in that it needs only count the properly received data packets and once the expected number has been received the transmission power level can be changed to the next predefined level.

Such sequencing can be extended further to include multiple frequencies. For example, fifty data packets at a first power level TXpower1 and frequency TXfrequency1, followed by fifty data packets at a second power level TXpower2 and frequency TXfrequency2, followed by fifty more data packets at a third power level TXpower3 and frequency TXfrequency3, and so on for virtually any number of combinations of power levels and frequencies.

As noted above, retrieving RSSI information from the DUT 20 is more complex. Since the data within the data packets is defined by the test data transmitted from the test instrument(s) 10, the DUT cannot communicate RSSI information when looping back the data packets without modifying them. While it is possible to have the DUT 20 store RSSI information for a later retrieval, accessing data from a DUT 20 during manufacturing test can often be problematic and relatively time consuming.

In accordance with the presently claimed invention, however, it is possible to have the DUT 20 loop back, i.e., return, data packets when its internal RSSI measurement indicates a match with a predetermined level or within a predetermined range. The test instrument(s) 10 can then search for the desired level or range by transmitting test data packets 100 at various transmission powers, e.g., in accordance with a "thermometer" search. Alternatively, the DUT 20 can be programmed to loop back data packets when the RSSI measured is greater than or equal to a desired level, thereby enabling the use of a binary search algorithm, since it can simply be determined whether a value is smaller than, greater than or equal to a desired value. A binary search can be more advantageous as it will often yield the result within a predetermined number of received data packets, so the DUT 20 can enter a RSSI test mode for a known number of data packets and then automatically exit such test mode when the specified number of data packets has been received. A "thermometer" search can require a greater number of test data packets, unless it is known that the testing begins near the expected RSSI threshold, in which case either technique should be satisfactory. (In such a test mode, parallel testing of receive and transmit functions of the DUT 20 can be more complicated, since it may not be known how many data packets will be returned from the DUT 20 during the search, which will depend on the RSSI information for a given signal level.)

Figure 6:
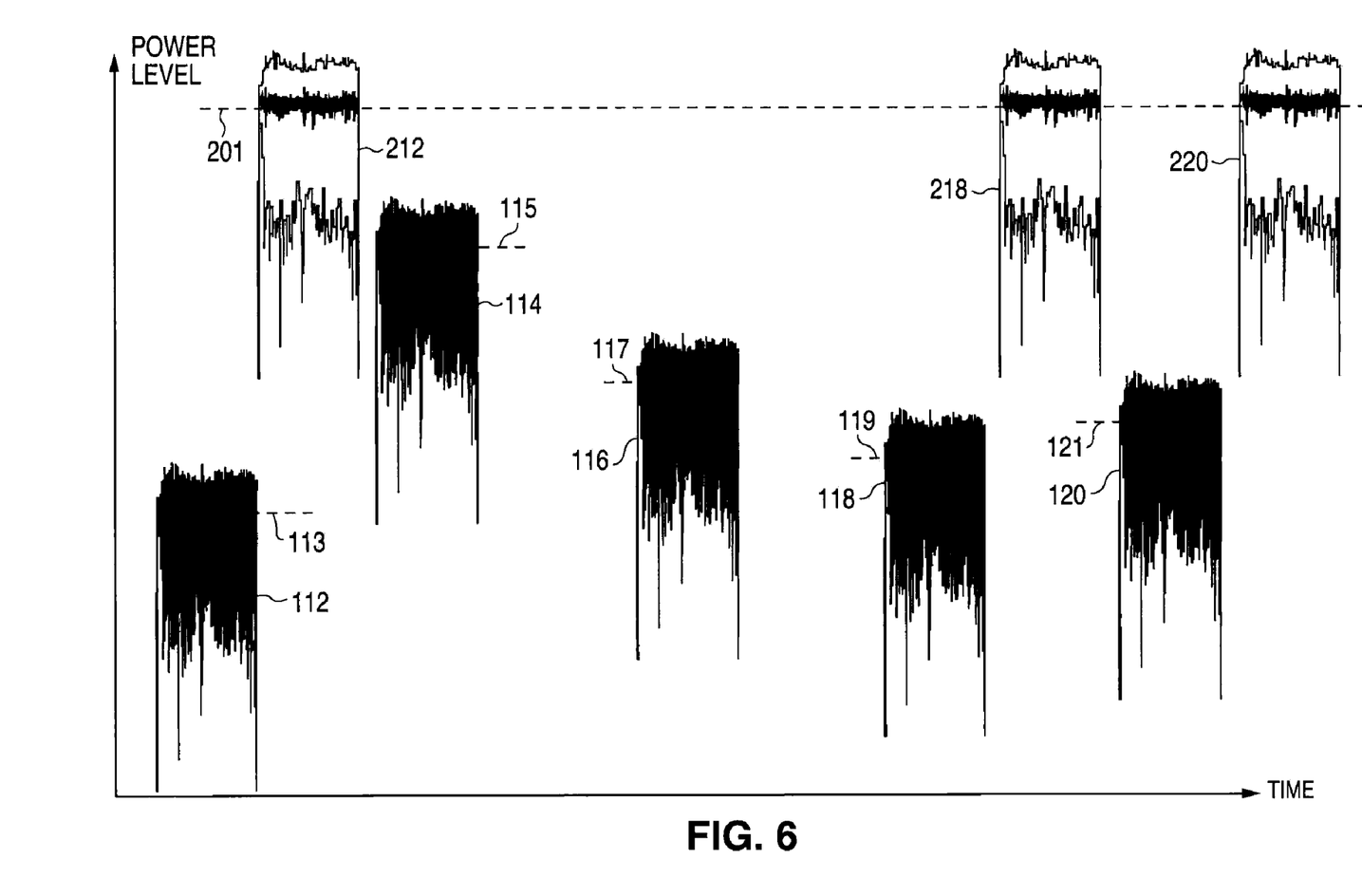
FIG. 6 depicts a signal sequence for a test method in accordance with an exemplary embodiment of the presently claimed invention.

Referring to FIG. 6, in accordance with an exemplary embodiment of the presently claimed invention, an RSSI test using a binary search approach can be implemented. It is assumed the DUT 20 will return a data packet when the measured RSSI level is less than or equal to the desired level. Accordingly, the first test data packet 112 is transmitted at a low power level 113, which is chosen to be lower than the level necessary to verify that the DUT 20 can be assured of reliably receiving such data packet 112. In response, the DUT 20 returns a corresponding data packet 212, thereby indicating that the received power level 113 is, in fact, lower than or equal to the desired level. The test instrument(s) 10 then change to a new power level 115 at which the next data packet 114 is transmitted. The DUT 20 does not reply with a data packet, thereby indicating that the received power level is higher than the desired power level. The test instrument(s) 10 reduce transmission power to a lower value 117 at which the next data packet 116 is transmitted. Again, this transmission power 117 is still too high so the DUT 20 does not reply. The test instrument(s) 10 then reduce the power further to a lower value 119 for transmitting the next data packet 118. This results in a returned data packet 218 from the DUT 20, thereby indicating that the test data packet power level 119 is lower than or equal to the expected RSSI level. The test instrument(s) 10 then increase the transmission power to a new level 121 at which the next data packet 120 is transmitted. If the RSSI level is still lower than or equal to the expected level, the DUT 20 responds by returning a corresponding data packet 220. It will be readily appreciated that the test instrument(s) 10 can continue to increase the transmission power level until such time as the DUT 20 again fails to return a corresponding data packet, thereby confirming the expected RSSI level.

This technique can work for both calibration and verification of RSSI, since the final power level transmitted by the test instrument(s) 10 and the expected RSSI level of the DUT 20 are known, thereby allowing calculation of the difference between the input level and the expected RSSI. This can be used to calculate the required offset or simply determine pass or fail for the RSSI level.

Another useful capability will be that of calibrating transmission signal power. Many calibration methods exist, and many include a feed forward calibration where the DUT 20 would transmit at one or more of predetermined power levels (or control register settings, e.g., for IQ mismatches), with the desired performance being extrapolated from the measured data and information about the transmit settings used within the DUT 20. This can then be combined with a sequential approach where a predetermined number of data packets are transmitted with a given power setting, after which the control parameters are changed to different settings and the sequence is repeated.

Figure 7:
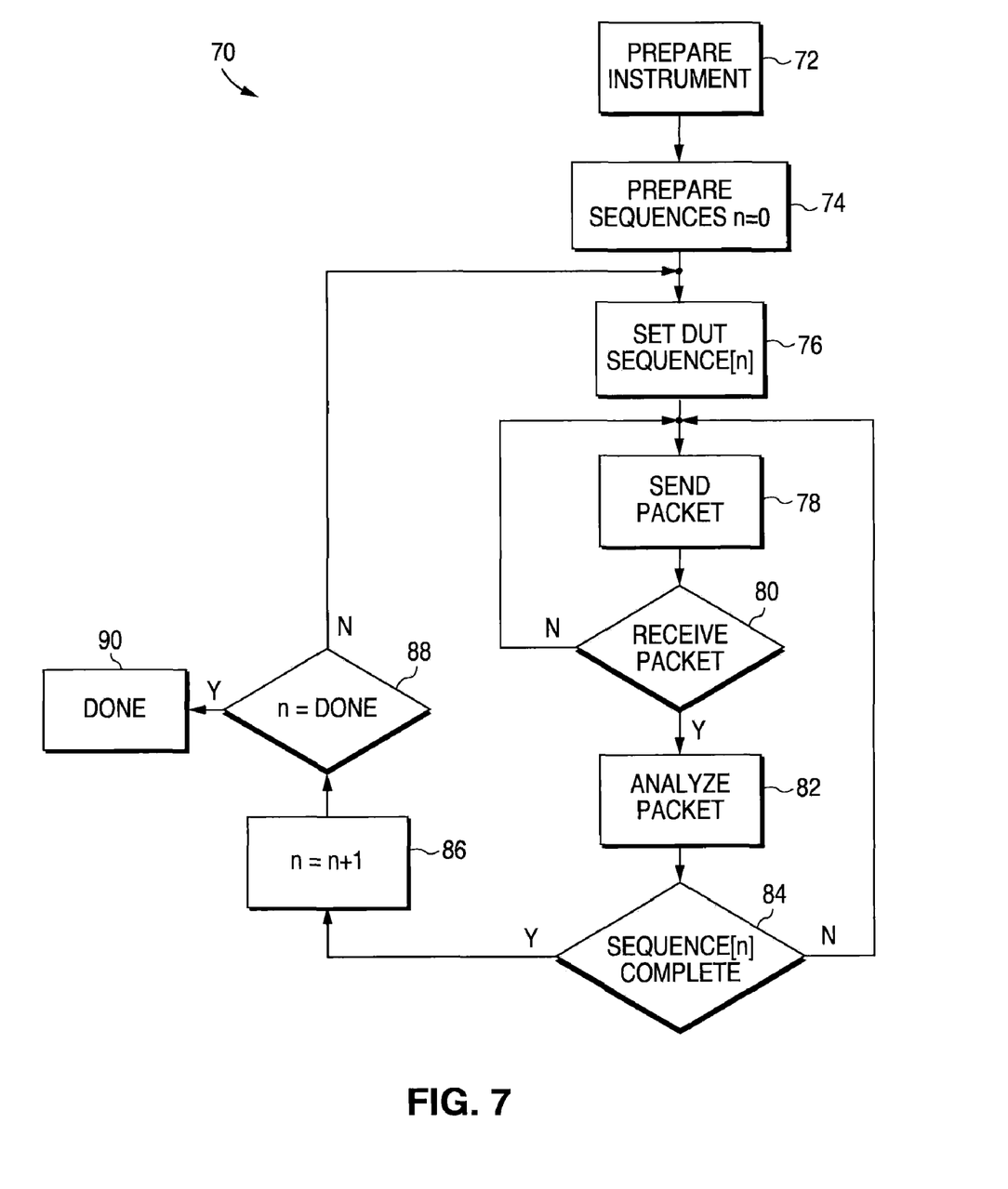
FIG. 7 is a flow chart for a test method in accordance with an exemplary embodiment of the presently claimed invention.

Referring to FIG. 7, a calibration sequence in accordance with an exemplary embodiment of the presently claimed invention begins with preparation 72 of the test instrument(s) 10 and preparation 74 of the DUT 20 to perform a defined set of sequences, with the segment counter/index n reset to zero (n=0). The first sequence with n=0is then activated 76. The test instrument(s) 10 transmit 78 a test data packet. If the DUT 20 returns 80 a data packet, that data packet as received by the test instrument(s) is analyzed 82. If no data packet is returned from the DUT 20, the test instrument(s) 10 will send 78 a new data packet. When a returned data packet is received and analyzed 82, the test instrument(s) 10 and DUT 20 will confirm 84 whether the sequence is complete. If not, another data packet is transmitted 78 by the test instrument(s) 10. If the sequence is complete, the segment counter n is incremented 86 in preparation to select the next sequence in the DUT 20. This will usually result in different settings being programmed into the control registers within the DUT 20, e.g., controlling the power, frequency or other parameters. If all sequences have been executed 88, the test is complete 90. If not, the next sequence is selected 76 based on the new sequence counter value n and the test continues.

Advantageously, the loop back test mode, as discussed above, allows multiple calibrations to be performed in parallel, e.g., in a sequence requiring ten data packets to be returned from a DUT 20 acting as a Bluetooth enhanced data rate (EDR) transmitter. Sometimes a separate power calibration is required when a transmitter operates in basic mode (Gaussian frequency shift keying (GFSK) modulation), and then operating in EDR mode (8 phase shift keying (8PSK) modulation) mode. The DUT 20 only knows it needs to receive and return copies of ten data packets. Accordingly, the test instrument(s) 10 can send basic rate packets to the DUT 20 until five packets have been returned from the DUT 20, following which it can switch to send EDR packets until the remaining five packets have been returned from the DUT 20. This will allow calibration of the two modes to happen virtually in parallel (e.g., interleaved), since it is assumed multiple levels will be tested as part of a full calibration sequence.

During such a calibration sequence, it is not necessary that all returned data packets be analyzed. For example, the test instrument(s) 10 can simply count the first group of data packets being returned from the DUT 20 and analyzed only the remaining data packets. This will allow the DUT transmitter to settle to the correct power level prior to the analysis. Additionally, it is possible to perform the RSSI test and calibration sequence in parallel. Further, all of these tests and sequences can be performed over various power levels, as well as over different frequencies, thereby enabling testing to be performed in a single sequence. Synchronization between the test instrument(s) 10 and the DUT 20 can be done in accordance with the techniques disclosed in U.S. patent application Ser. No. 11/839,788, filed Aug. 16, 2007, and entitled "Apparatus, System And Method For Calibrating And Verifying A Wireless Communication Device", the disclosure of which is hereby incorporated herein by reference.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a data packet transceiver as a device under test (DUT) by communicating pluralities of data packets between one or more test instruments and said DUT, comprising:

programming said DUT for loop back operation, wherein a received data packet is decoded to produce decoded data and said decoded data is encoded to produce a corresponding new data packet for transmission;

transmitting, with said one or more test instruments, a plurality of sequential test data packets for reception by said DUT, wherein, in correspondence with said programming of said DUT, at least first and second portions of said transmitted plurality of sequential test data packets have at least one of a plurality of mutually distinct signal characteristics including data packet type, transmission power and transmission frequency such that said signal characteristic of said first portion of said transmitted plurality of sequential test data packets is different from said signal characteristic of said second portion of said transmitted plurality of sequential test data packets;

receiving, with said one or more test instruments, a plurality of sequential DUT data packets from said DUT, wherein, in accordance with said programming of said DUT, at least first and second portions of said plurality of sequential DUT data packets have at least one of said plurality of mutually distinct signal characteristics such that said signal characteristic of said first portion of said plurality of sequential DUT data packets is different from said signal characteristic of said second portion of said plurality of sequential DUT data packets; and processing said plurality of sequential DUT data packets.

2. The method of claim 1, wherein said transmitting of said plurality of sequential test data packets and said receiving of said plurality of sequential DUT data packets comprise transmitting a portion of said plurality of sequential test data packets substantially simultaneously with receiving a portion of said plurality of sequential DUT data packets.

3. The method of claim 1, wherein:
said transmitting of said plurality of sequential test data packets comprises
encoding a plurality of test data to produce a test data packet, and
transmitting said test data packet;
said method further comprises
receiving said test data packet with said DUT,
decoding said received test data packet with said DUT to produce a plurality of DUT data,
encoding said plurality of DUT data with said DUT to produce a DUT data packet, and
transmitting said DUT data packet with said DUT;
said receiving of said plurality of sequential DUT data packets comprises receiving said DUT data packet; and
said processing said plurality of sequential DUT data packets comprises
decoding said received DUT data packet to produce a plurality of received data, and
comparing said pluralities of test data and received data.

4. The method of claim 1, wherein said processing said plurality of sequential DUT data packets comprises comparing respective ones of said plurality of sequential DUT data packets with corresponding ones of said plurality of sequential test data packets.

5. The method of claim 1, wherein said processing said plurality of sequential DUT data packets comprises computing a packet error rate (PER) for said DUT.

6. The method of claim 1, wherein said processing said plurality of sequential DUT data packets comprises computing a bit error rate (BER) for said DUT.

7. The method of claim 1, wherein said processing said plurality of sequential DUT data packets comprises one or more of:
computing an error vector magnitude (EVM) for said DUT;
measuring a power level of said received plurality of sequential DUT data packets from said DUT; and
measuring a spectral mask associated with said received plurality of sequential DUT data packets from said DUT.

8. The method of claim 1, further comprising programming said DUT for sequencing during said loop back operation, wherein:
a plurality of received data packets is decoded to produce a plurality of decoded data;
said plurality of decoded data is encoded to produce a corresponding plurality of new data packets for transmission; and
respective portions of said plurality of new data packets are transmitted with at least one of mutually distinct transmission power levels and transmission frequencies.

9. The method of claim 1, wherein:
each one of said plurality of sequential test data packets includes cyclic redundancy check (CRC) data; and
said plurality of sequential DUT data packets is smaller than said plurality of sequential test data packets when a CRC error is encountered.

10. A method for testing a data packet transceiver as a device under test (DUT) by communicating pluralities of data packets between one or more test instruments and said DUT, comprising:
programming said DUT for loop back operation, wherein a received data packet is decoded to produce decoded data and said decoded data is encoded to produce a corresponding new data packet for transmission;
communicating respective pluralities of data packets between said one or more test instruments and said DUT by
encoding a plurality of test data with said one or more instruments to produce a test data packet,
transmitting said test data packet with said one or more test instruments, receiving said test data packet with said DUT,
decoding said received test data packet with said DUT to produce a plurality of DUT data,
encoding said plurality of DUT data with said DUT to produce a DUT data packet,
transmitting said DUT data packet with said DUT,
receiving said DUT data packet with said one or more test instruments, and
repeating said encoding of a plurality of test data, said transmitting of said test data packet, said receiving of said test data packet, said decoding of said received test data packet, said encoding of said plurality of DUT data, said transmitting of said DUT data packet and said receiving of said DUT data packet to produce a plurality of test data packets, a plurality of transmitted test data packets and a plurality of received DUT data packets, wherein
in correspondence with said programming of said DUT, selected respective ones of said plurality of transmitted test data packets have at least one of a plurality of mutually distinct signal characteristics including data packet type, transmission power and transmission frequency such that said signal characteristic of a first selected one of said plurality of transmitted test data packets is different from said signal characteristic of a second selected one of said plurality of transmitted test data packets, and
in accordance with said programming of said DUT, selected respective ones of said plurality of received DUT data packets have at least one of said plurality of mutually distinct signal characteristics such that said signal characteristic of a first selected one of said plurality of received DUT data packets is different from said signal characteristic of a second selected one of said plurality of received DUT data packets; and
processing said plurality of received DUT data packets.

11. The method of claim 10, wherein said transmitting said test data packet and said transmitting said DUT data packet comprise transmitting said test data packet, at least in part, simultaneously with said transmitting said DUT data packet.

12. The method of claim 10, wherein said processing said plurality of received DUT data packets comprises:
decoding each of said plurality of received DUT data packets to produce a corresponding plurality of received data; and
comparing said pluralities of test data and received data.

13. The method of claim 10, wherein said processing said plurality of received DUT data packets comprises comparing respective ones of said plurality of received DUT data packets with corresponding ones of said plurality of test data packets.

14. The method of claim 10, wherein said processing said plurality of received DUT data packets comprises computing a packet error rate (PER) for said DUT.

15. The method of claim 10, wherein said processing said plurality of received DUT data packets comprises computing a bit error rate (BER) for said DUT.

16. The method of claim 10, wherein said processing said plurality of received DUT data packets comprises one or more of:

computing an error vector magnitude (EVM) for said DUT;

measuring a power level of said received plurality of sequential DUT data packets from said DUT; and measuring a spectral mask associated with said received plurality of sequential DUT data packets from said DUT.

17. The method of claim 10, further comprising programming said DUT for sequencing during said loop back operation, wherein:

a plurality of received data packets is decoded to produce a plurality of decoded data;

said plurality of decoded data is encoded to produce a corresponding plurality of new data packets for transmission; and respective portions of said plurality of new data packets are transmitted with at least one of mutually distinct transmission power levels and transmission frequencies.

18. The method of claim 10, wherein:

said test data packet includes cyclic redundancy check (CRC) data; and said plurality of received DUT data packets is smaller than said plurality of transmitted test data packets when a CRC error is encountered.

* * * * *

UNITED STATES PATENT AND TRADEMARK OFFICE
CERTIFICATE OF CORRECTION

PATENT NO. : 7,773,531 B2  
APPLICATION NO. : 12/170665  
DATED : August 10, 2010  
INVENTOR(S) : Christian Volf Olgaard, Ray Wang and Peter Peterson Page 1 of 1

It is certified that error appears in the above-identified patent and that said Letters Patent is hereby corrected as shown below:

Col. 10, in claim 1, line 49 delete the text beginning with "such that" to and ending on line 54 with "data packets"

Col. 10, in claim 1, line 60 delete the text beginning with "such that" to and ending on line 64 with "data packets"

Col. 10, in claim 10, line 32 delete the text beginning with "such that" to and ending on line 36 with "data packets"

Col. 10, in claim 10, line 40 delete the text beginning with "such that" to and ending on line 44 with "data packets"

Signed and Sealed this

Twelfth Day of October, 2010

David J. Kappos  
*Director of the United States Patent and Trademark Office*